US008936299B2

(12) United States Patent
Tanaka et al.

(10) Patent No.: US 8,936,299 B2
(45) Date of Patent: Jan. 20, 2015

(54) VEHICLE FRONT BODY STRUCTURE

(75) Inventors: Junichi Tanaka, Hiroshima (JP);
Kenichi Yano, Hiroshima (JP);
Takayuki Nakamae, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/130,409

(22) PCT Filed: Jun. 21, 2012

(86) PCT No.: PCT/JP2012/004041
§ 371 (c)(1),
(2), (4) Date: Dec. 31, 2013

(87) PCT Pub. No.: WO2013/005381
PCT Pub. Date: Jan. 10, 2013

(65) Prior Publication Data
US 2014/0217777 A1  Aug. 7, 2014

(30) Foreign Application Priority Data
Jul. 6, 2011  (JP) .................................. 2011-149959

(51) Int. Cl.
*B62D 25/20* (2006.01)
*B62D 21/15* (2006.01)

(52) U.S. Cl.
CPC .............. *B62D 21/152* (2013.01); *B62D 25/20* (2013.01)
USPC ................................. 296/187.09; 296/203.02

(58) Field of Classification Search
USPC ............................ 296/193.01, 193.09, 203.03
IPC ....................................................... B62D 25/20
See application file for complete search history.

(56) References Cited

U.S. PATENT DOCUMENTS

| 5,267,630 | A | 12/1993 | Watanabe et al. |
| 5,472,063 | A | 12/1995 | Watanabe et al. |
| 6,736,448 | B2 * | 5/2004 | Hanakawa et al. ...... 296/187.09 |
| 6,880,663 | B2 * | 4/2005 | Fujiki et al. ................... 180/232 |

(Continued)

FOREIGN PATENT DOCUMENTS

| JP | 07-144660 A | 6/1995 |
| JP | 11-342862 A | 12/1999 |

(Continued)

OTHER PUBLICATIONS

International Search Report; PCT/JP2012/004041; Sep. 25, 2012.

*Primary Examiner* — Pinel Romain
(74) *Attorney, Agent, or Firm* — Studebaker & Brackett PC

(57) ABSTRACT

The present invention relates to a vehicle front body structure comprising a cross-sectionally closed front side frame installed to extend in a front-rear direction of a vehicle. The front side frame has a depressed section formed in a lower region of a vehicle-width directional inner wall surface portion thereof in such a manner as to be depressed toward a vehicle-width directional outward side. The front side frame is internally provided with a reinforcing member extending over a front-rear directional dimension of the depressed section. An upper portion of the reinforcing member is joined to at least one of a vehicle-width directional intermediate region of an upper wall portion of the front side frame and an area of the upper wall portion located outward side of the intermediate region, and a lateral portion of the reinforcing member is joined to a wall surface portion corresponding to the depressed section.

5 Claims, 8 Drawing Sheets

(56) References Cited

U.S. PATENT DOCUMENTS 7,762,619 B2 * 7/2010 Baccouche et al. ...... 296/187.09
2011/0309655 A1 12/2011 Mori

FOREIGN PATENT DOCUMENTS

| | | |
|---|---|---|
| JP | 3122158 B2 | 1/2001 |
| JP | 2010-221991 A | 10/2010 |

* cited by examiner

VEHICLE FRONT BODY STRUCTURE

TECHNICAL FIELD

The present invention relates to a vehicle front body structure comprising a cross-sectionally closed front side frame installed to extend in a front-rear direction of a vehicle.

BACKGROUND ART

Heretofore, as disclosed in the following Patent Document 1, there has been known a vehicle front structure comprising a long-shaped frame member comprised of a front side frame disposed along a front-rear direction of a vehicle, wherein the frame member is formed with a front bendable portion and a rear bendable portion in two points spaced apart from each other in a longitudinal direction thereof, and wherein positions of the front and rear bendable portions are set to become different from each other in a width direction or an up-down direction of the frame member. In this conventional structure, when a load along the longitudinal direction of the frame member is input into the frame member, each of the front and rear bendable portions is compressively deformed, so that the frame member is buckled into a wavy shape. Thus, when the frame member undergoes deformation, for example, due to vehicle collision, it becomes possible to prevent the deformed frame member from interfering with an engine or the like, thereby desirably attenuating a load during the collision.

In the vehicle front structure disclosed in the Patent Document 1, the front side frame constituting the long frame member has a depressed section which is formed in a lower region of a vehicle-width directional inner portion thereof to have two ridge lines each with an upwardly-curved curve shape in a central region thereof, so that it is possible to ensure an installation space for a powertrain comprising an engine and a transaxle assembly disposed in a front of the vehicle. However, in the case where the depressed section having the upwardly-curved central region is formed in the lower region of the vehicle-width directional inner portion of the front side frame, a vehicle collision load is liable to act concentratedly on the depressed section of the front side frame, which causes a problem that it is difficult to avoid a situation where the front side frame is deformed in such a manner as to be largely bent on the basis of the depressed section.

LIST OF PRIOR ART DOCUMENTS

Patent Documents

Patent Document 1: JP 2010-221991A

SUMMARY OF THE INVENTION

The present invention has been made in view of the above problems, and an object thereof is to provide a vehicle front body structure capable of effectively absorbing a vehicle collision load, while sufficiently ensuring an installation space for a powertrain in a front of a vehicle.

In order to solve the above problem, the present invention provides a vehicle front body structure which comprises a cross-sectionally closed front side frame installed to extend in a front-rear direction of a vehicle, wherein the front side frame has a depressed section formed in a lower region of a vehicle-width directional inner wall surface portion thereof in such a manner as to be depressed toward a vehicle-width directional outward side so as to avoid interference with a powertrain, the front side frame being internally provided with a reinforcing member extending over a front-rear directional dimension of the depressed section, and wherein: an upper portion of the reinforcing member is joined to at least one of a vehicle-width directional intermediate region of an upper wall portion of the front side frame and an area of the upper wall portion located outward side of the intermediate region; and a lateral portion of the reinforcing member is joined to a wall surface portion corresponding to the depressed section.

DESCRIPTION OF EMBODIMENTS

Figure 1:
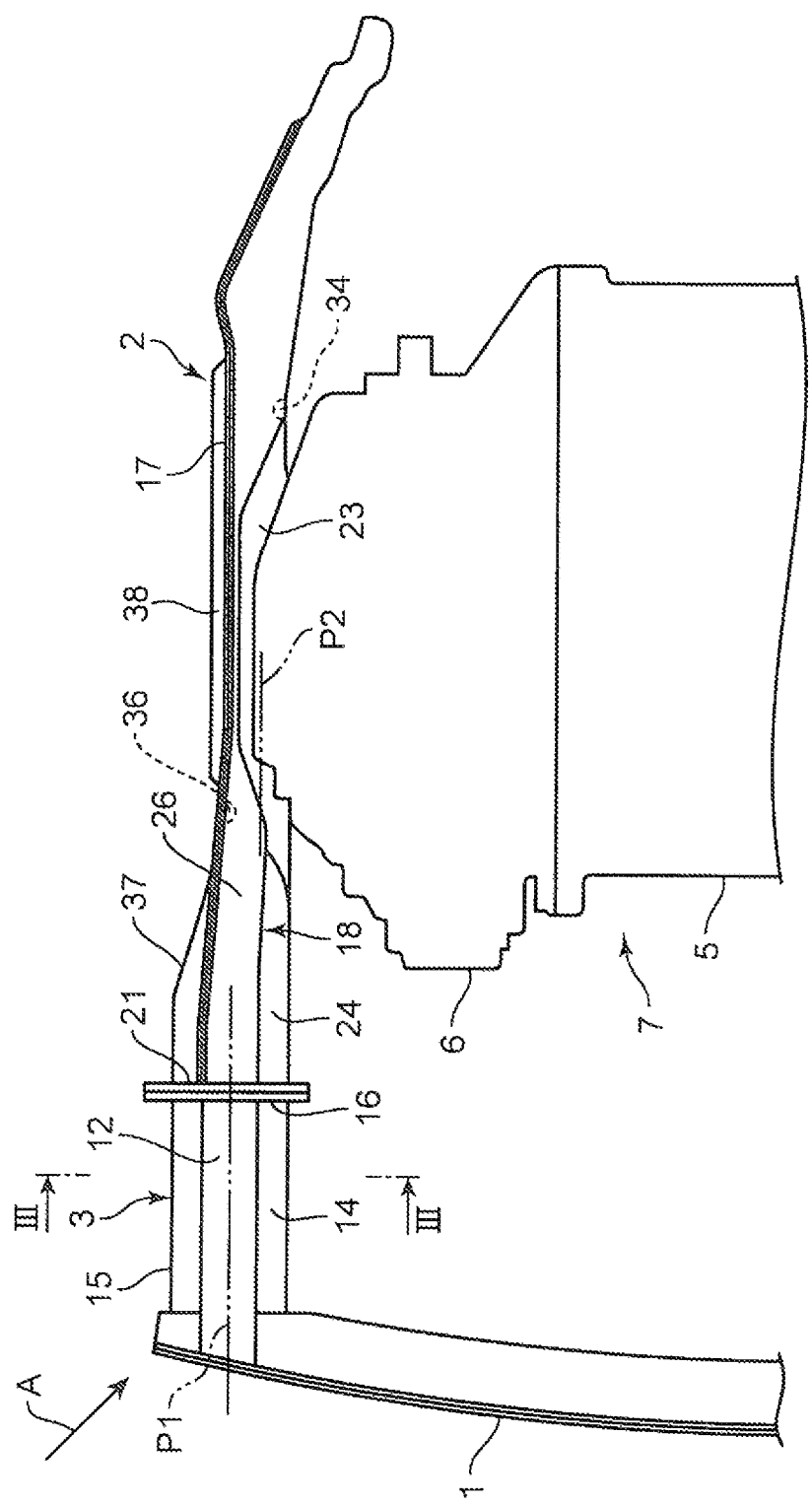
FIG. 1 is a bottom view illustrating one embodiment of a vehicle front body structure according to the present invention.
Figure 2:
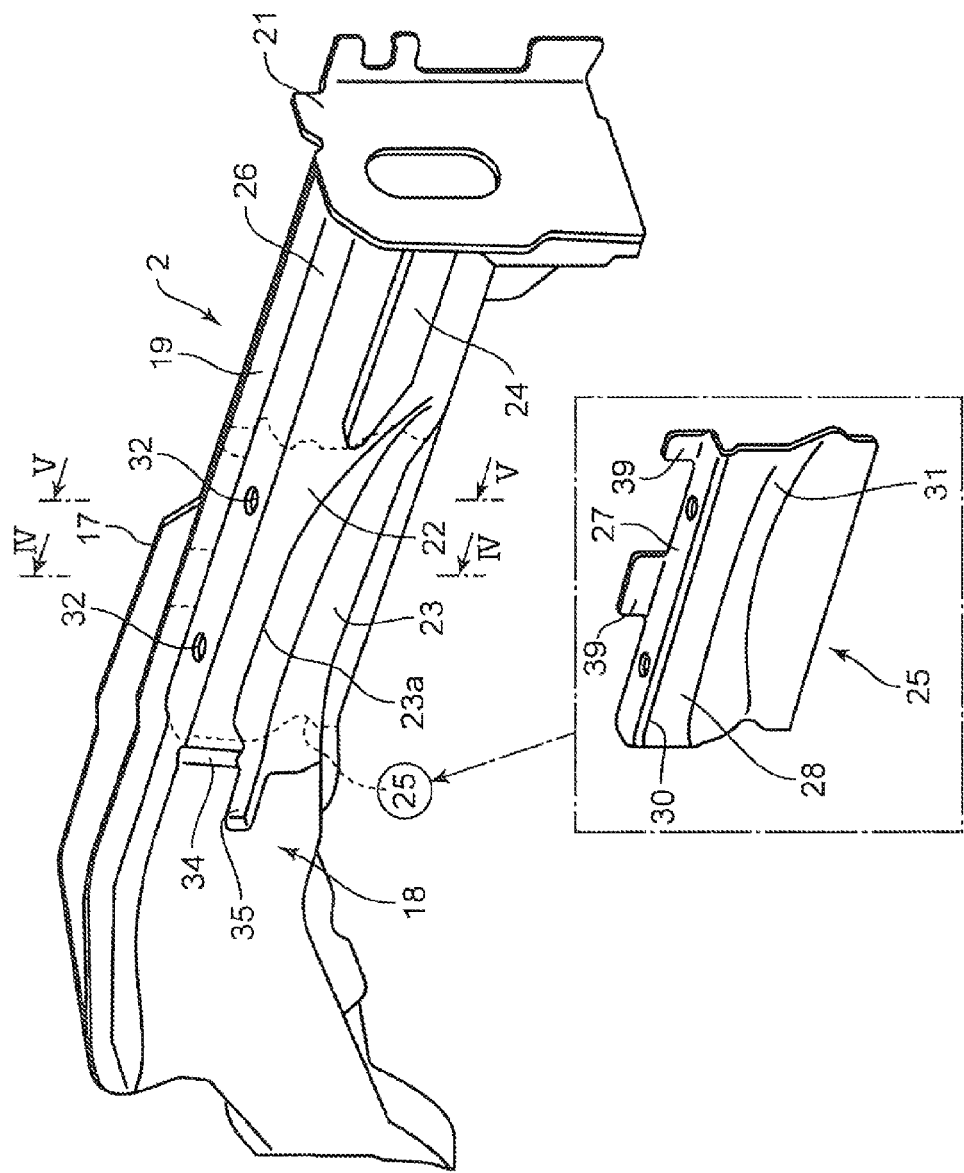
FIG. 2 is a perspective view illustrating a specific configuration of a front side frame.

FIGS. 1 and 2 illustrate one embodiment of a vehicle front structure according to the present invention. This vehicle front body structure comprises: a bumper beam 1 installed to extend in a width direction of a vehicle in a front end thereof; a pair of right and left front side frames 2 each installed to extend in a front-rear direction of the vehicle along a respective one of right and left side edges of a front body of the vehicle; and a crush can 3 disposed between corresponding ones of right and left ends of the bumper beam 1 and the front side frames 2.

A powertrain 7 comprising an engine 5 making up a driving mechanism for a hybrid vehicle and a transaxle assembly 6 including a motor-generator and a power transfer mechanism is disposed rearward of the bumper beam 1 and between the right and left front side frames 2. The powertrain 7 is disposed such that right and left ends of the powertrain 7 are supported, respectively, by the front side frames 2, and a lower portion of the powertrain 7 is supported by a subframe (not illustrated) disposed below the front side frame 2.

Figure 3:
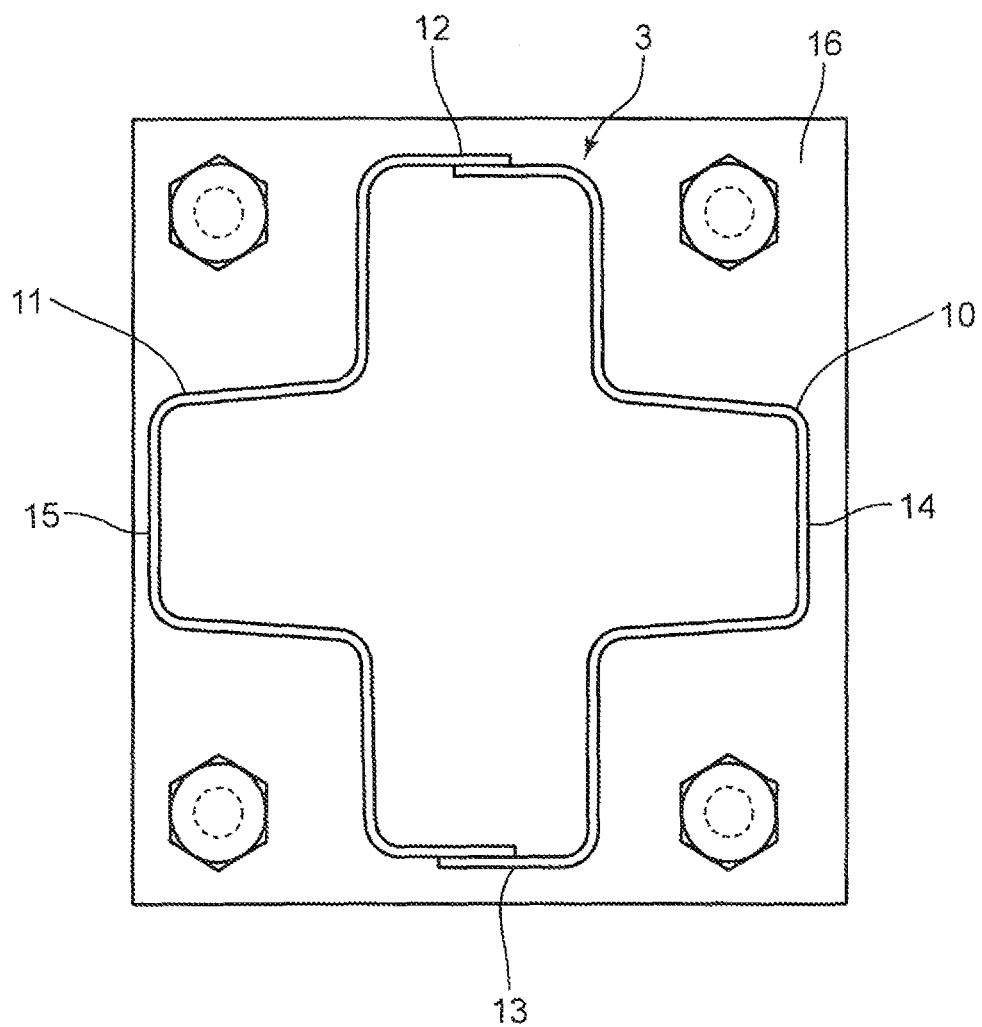
FIG. 3 is a front view illustrating a specific configuration of a crush can.

As illustrated in FIG. 3, the crush can 3 is formed in an approximately cross shape having four cross-sectionally angular-C shaped protruding portions 12 to 15 protruding in an up-down direction and a right-left direction, in front view, by: subjecting a steel plate having a thickness less than that of the front side frame 2 to press working to form two approximately bilaterally symmetric bended members 10, 11; and spot-welding the bended members 10, 11 while butting respective ends thereof. The crush can 3 also has an attaching plate 16 fixedly attached to a rear end thereof, and attachable to a front end of the front side frame 2.

Figure 4:
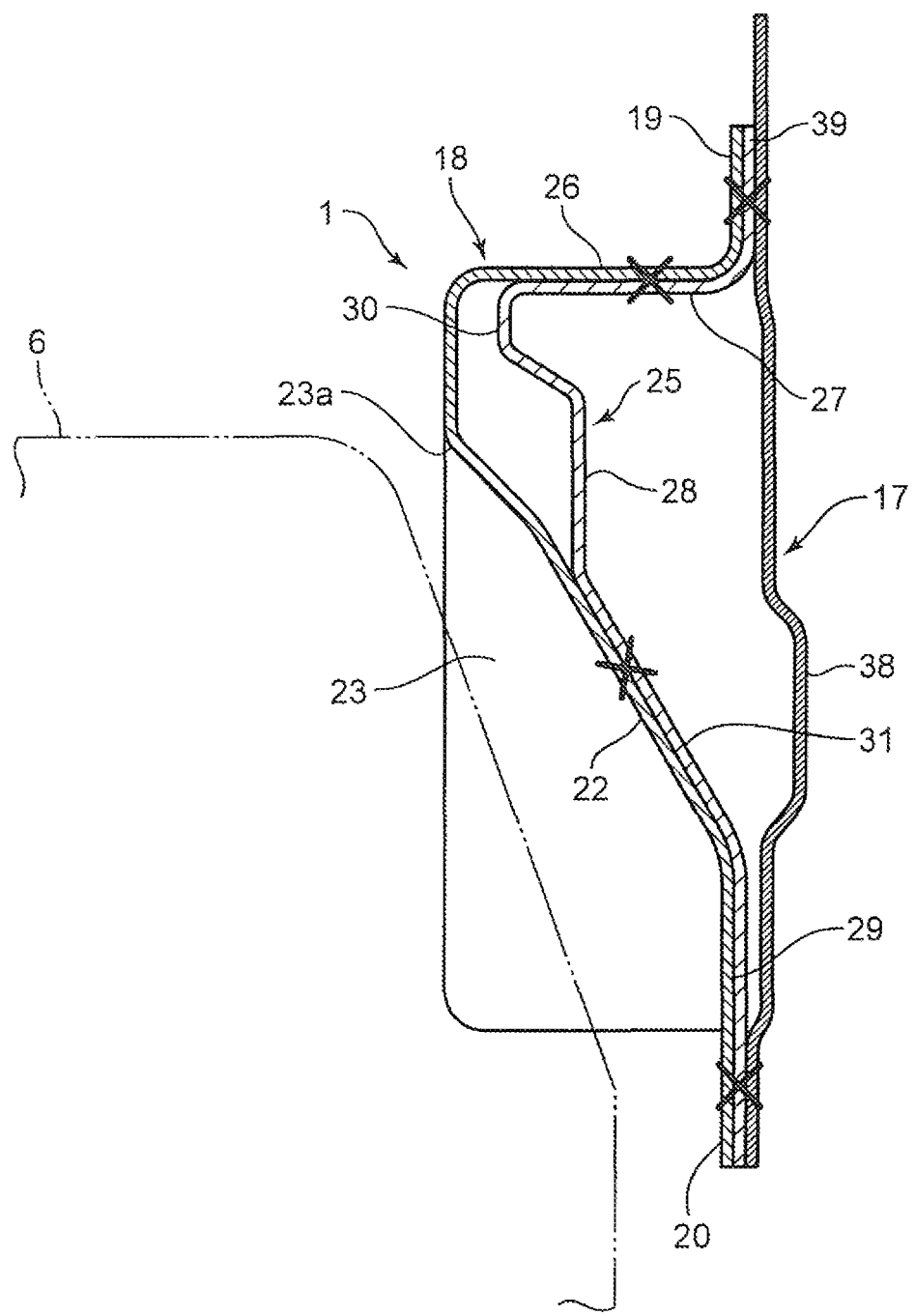
FIG. 4 is a front sectional view illustrating the specific configuration of the front side frame.

As illustrated in FIG. 4, the front side frame 2 comprises an outer panel 17 composed of a steel plate forming an outer wall surface portion thereof, and a cross-sectionally angular-C shaped inner panel 18 disposed inward side of the outer panel 17. The front side frame 2 is formed to have a cross-sectionally closed shape extending in the front-rear direction of the vehicle, for example, by spot-welding two attaching flanges 19, 20 provided in upper and lower edge regions of the inner panel 18, to upper and lower edge regions of the outer panel 17, respectively. The front side frame 2 also has a mounting base plate 21 fixedly attached to the front end thereof. The attaching plate 16 of the crush can 3 is attached to the mounting base plate 21, for example, by means of bolting.

One of the front side frames 2 located in one side (in this embodiment, left side of the vehicle) where the transaxle assembly 6 is installed has a depressed section 23 formed by depressing a lower region of a lateral wall surface portion 22 of the inner panel 18 constituting a vehicle-width directional inner wall surface portion of the front side frame 2, toward a vehicle-width directional outward side. The depressed section 23 is formed in a position overlapping a vehicle-width directional outer end of the transaxle assembly 6 in bottom view, to become able to avoid interference between the transaxle assembly 6 and the front side frame 2.

In a rear region of the depressed section 23, an upper edge 23a of the depressed section 23 is located on an area above an up-down directional center of the front side frame 2. Then, a region of the inner panel 18 below the upper edge 23a formed in the lateral wall surface portion 22 is inclined to be located on the vehicle-width directional outward side, so that the depressed section 23 depressed toward the vehicle-width directional outward side is formed in the lateral wall surface portion 22 of the inner panel 18.

Further, in a front region of the depressed section 23, as illustrated in FIG. 2, the upper edge 23a of the depressed section 23 extends from the area above the up-down directional center of the front side frame 2 toward a front side of the vehicle, while curving obliquely frontwardly and downwardly. Thus, the front region of the depressed section 23 is formed such that an up-down directional dimension thereof gradually decreases toward the front side, and the upper edge 23a at a front end of the depressed section 23 is located in a region below the up-down directional center of the front side frame 2.

In the lateral wall surface portion 22 of the inner panel 18 located in a front region of the front side frame 2, an area overlapping the protruding portion 14 of the crush can 3 located on the vehicle-width directional inward side in front view has a reinforcement section 24 composed of a bulging section bulging toward a vehicle-width directional inward side and provided to extend in the front-rear direction. The reinforcement section 24 is provided at a position overlapping the depressed section 23 in front view and frontward of the depressed section 23 (see FIG. 1), and a lower hem of a rear region of the reinforcement section 24 is connected to a vicinity of an upper edge of the front region of the depressed section 23.

A reinforcing member 25 is disposed inside the front side frame 2 to reinforce the setup region of the depressed section 23. As illustrated in FIG. 4, the reinforcing member 25 has an upper plate 27 joined to an upper wall portion 26 of the inner panel 18, a lateral plate 28 extending downwardly from a vehicle-width directional inner end of the upper plate 27, and a joining flange 29 extending downwardly from a lower end of the lateral plate 28 and joined to the attaching flange 20 provided at a lower end of the inner panel 18.

The reinforcing member 25 is provided to extend over a front-rear directional dimension of the depressed section 23. That is, the reinforcing member 25 has a front-rear directional dimension equal to that of the depressed section 23, and is provided in overlapping relation with the depressed section 23 in side view.

Figure 5:
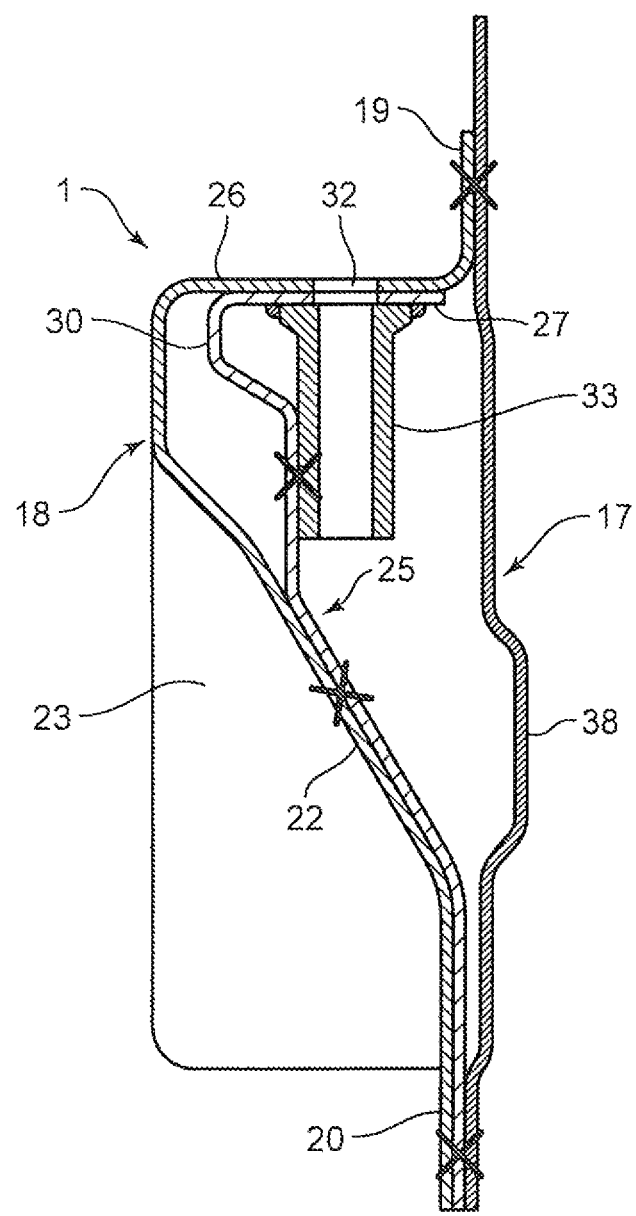
FIG. 5 is a front sectional view illustrating an installation configuration of a mounting member.

The mark x in FIGS. 4 and 5 indicates a spot-welded area between the front side frame 2 and the reinforcing member 25. The reinforcing member 25 is joined to the inner panel 18 of the front side frame 2 by spot-welding an upper portion (the upper plate 27) of the reinforcing member 25 to an upper wall of the front side frame 2, i.e., at least one of a vehicle-width directional intermediate region of the upper wall portion 26 of the front side frame 18 and an area of the upper wall portion 26 located outward side of the intermediate region, and spot-welding a lateral portion (the lateral plate 28) of the reinforcing member 25 to a wall surface portion corresponding to the depressed section 23 (the lower region of the lateral wall surface portion 22 of the inner panel 18). Further, a front end of the reinforcing member 25 is joined to the vehicle-width directional inner wall surface portion of the front side frame 2, i.e., the lateral wall surface portion 22 of the inner panel 18, at a height position equal to that of the reinforcement section 24 (see FIG. 2).

The reinforcing member 25 has a bulging section 30 obtained by forming an upper region of the lateral plate 28 to bulge toward the vehicle-width directional inward side and extend in the front-rear direction, and the lateral plate 28 has an inclined section 31 formed in a lower region thereof to incline in an outwardly spreading manner along the lateral wall surface portion 22 of the inner panel 18. Then, the lateral wall surface portion 22 of the inner panel 18 and the inclined section 31 of the reinforcing member 25 are joined to each other by spot welding the inclined section 31 of the reinforcing member 25 to the wall surface portion corresponding to the depressed section 23 approximately at the up-down directional center of the front side frame 2.

Further, the upper wall portion 26 of the front side frame 2 is formed with two vehicle-component mounting holes 32 at positions aligned in the front-rear direction, as illustrated in FIG. 2, and an up-down directionally extending, tubular-shaped mounting member 33 is attached just below each of the mounting holes 32, as illustrated in FIG. 5. The mounting member 33 is composed, for example, of a pipe member or weld nut for mounting thereto a vehicle component consisting of the transaxle assembly 6 of the powertrain 7. It is installed to couple upper and lower sides of the bulging section 30 provided in the upper region of the reinforcing member 25, and fixed to the upper plate 27 of the reinforcing member 25, for example, by means of braze welding. In this regard, an upper portion of the mounting member 33 is not necessarily welded to the upper plate 27 of the reinforcing member 25, but the upper portion of the mounting member 33 may be fixed to the upper plate 27 of the reinforcing member 25 and the upper wall portion 26 of the inner panel 18, according to a fastening force during an operation of attaching the vehicle component to the mounting member 33 using a fastening bolt.

As illustrated in FIG. 2, the upper plate 27 of the reinforcing member 25 is provided with a plurality of (in the illustrated embodiment, two) joining flanges 39 each protruding upwardly while being spaced apart from each other in the front-rear direction. The two sets of the mounting hole 32 and the mounting member 33 are provided in a region where the joining flanges 39 do not exist, i.e., an area located between the front joining flanges 39 and the rear joining flanges 39, and an area located rearward of the rear joining flanges 39. This is intended to allow a fixing position of the mounting member 33 to come as close to the outer panel 17 as possible, while ensuring a space for fixing the mounting member 33 composed, for example, of a pipe member or a weld nut, at a position just below the mounting hole 32.

That is, as illustrated in FIG. 4, in a region where the joining flanges 39 exist, each of the joining flanges 39 is interposed between the outer panel 17 and the flange 19 of the inner panel 18, so that a position of the flange 19 of the inner panel 18 is set to be offset on the vehicle-width directional inward side by a distance corresponding to a plate thickness of the joining flanges 39. On the other hand, as illustrated in FIG. 5, in the region where the joining flanges 39 do not exist, the position of the flange 19 of the inner panel 18 is set to be offset relatively on the vehicle-width directional outward side. Thus, when the sets of the mounting hole 32 and the mounting member 33 are provided in the region where the joining flanges 39 do not exist, a position of the mounting member 33 can be set to be further offset on the vehicle-width directional outward side (on a side closer to the outer panel 17). Furthermore, as a result, a protruding amount of the bulging section 30 of the reinforcing member 25 toward the vehicle-width directional outward side is ensured at a larger level, thereby providing enhanced rigidity of the reinforcing member 25.

Figure 6:
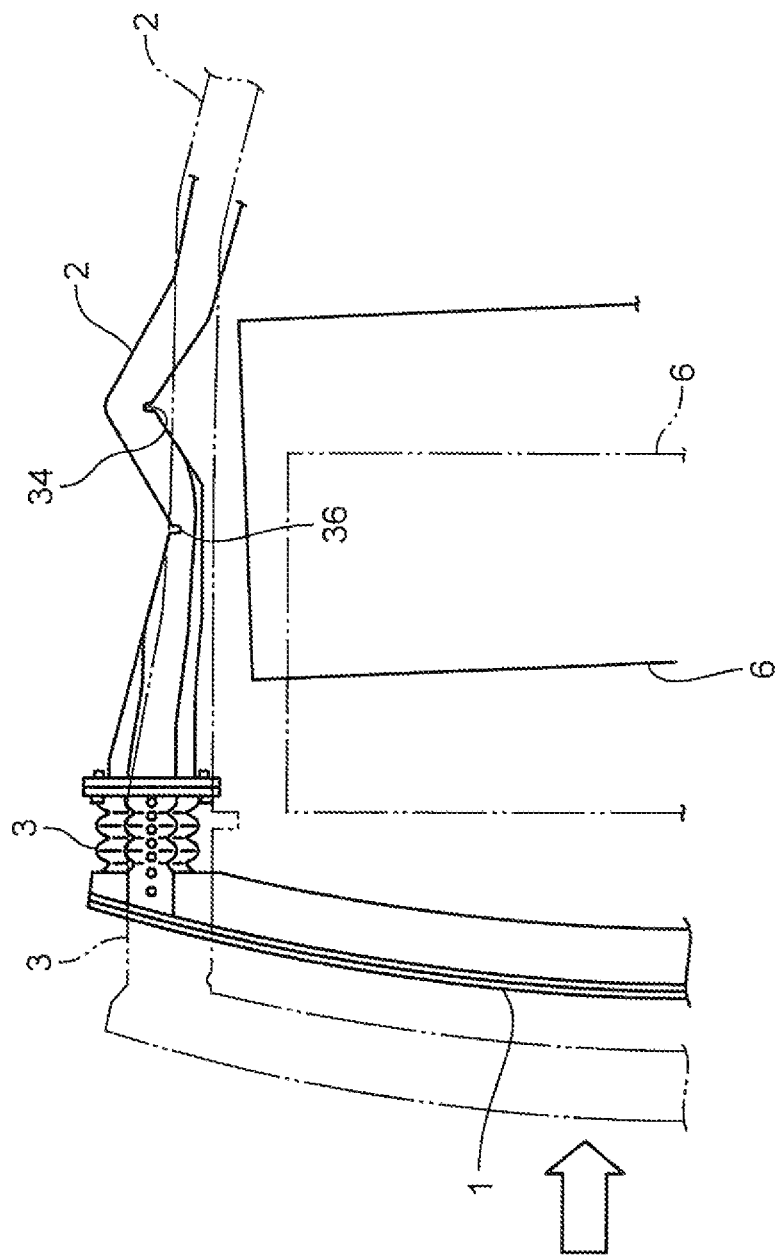
FIG. 6 is an explanatory diagram illustrating a deformed state of a front body of a vehicle.

The inner panel 18 of the front side frame 2 is formed with a bending facilitating section 34 (see FIGS. 1 and 2) composed of a concave groove provided in an area located rearward of the setup region of the depressed section 23 to extend in an up-down direction, and a concave groove-like bead section 35 extending rearwardly from a lower end of the bending facilitating section 34. Thus, as described later, a phenomenon is facilitated that, according to an action of a frontal collision load during a vehicle frontal collision, a front-rear directional intermediate region of the front side frame 2 is bent into a V shape toward the vehicle-width directional outward side, about the bending facilitating section 34, as illustrated in FIG. 6.

Figure 7:
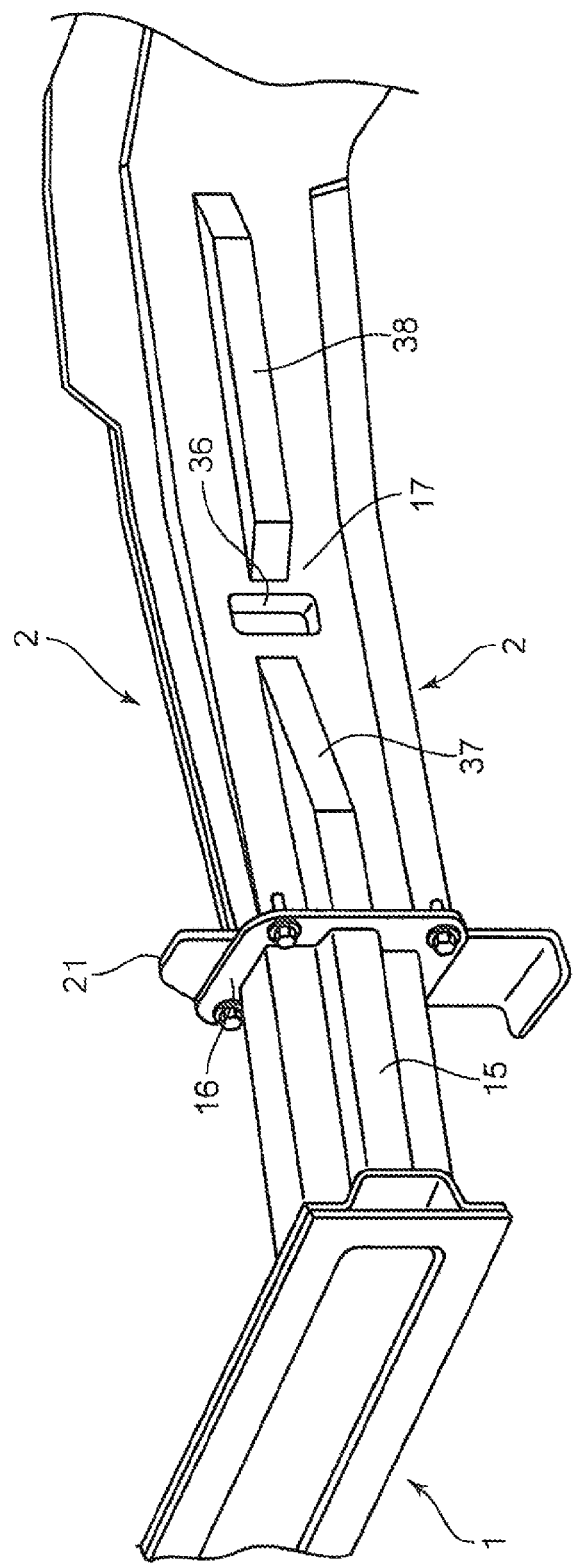
FIG. 7 is a perspective view illustrating the specific configuration of the front side frame.

Further, as illustrated in FIGS. 1 and 7, the outer panel 17 of the front side frame 2 is formed with a bending facilitating section 36 composed of a concave groove provided in an area located frontward of the setup region of the depressed section 23 to extend in an up-down direction. On a frontward side with respect to the bending facilitating section 36, a reinforcement section 37 composed of a bulging section bulging toward the vehicle-width directional outward side is provided at a position overlapping the protruding portion 15 of the crush can 3 located on the vehicle-width directional outward side in front view, to extend in the front-rear direction. The reinforcement section 37 of the outer panel 17 is set such that a front-rear directional dimension thereof becomes less than that of the reinforcement section 24 of the inner panel 18.

Further, as illustrated in FIG. 1, the front region of the front side frame 2 is inclined to be located on the vehicle-width directional outward side with respect to a rear region thereof, in a top plan view, so that a central axis P1 of the crush can 3 and the front region of the front side frame 2 is disposed to be offset toward the vehicle-width directional outward side with respect to a central axis P2 of the rear region of the front side frame 2. Thus, as described later, a phenomenon is facilitated that, when a large frontal collision load acts on a vehicle during a vehicle frontal collision, the front-rear directional intermediate region of the front side frame 2 is bent into a V shape toward the vehicle-width directional outward side, on the basis of the bending facilitating section 36, as illustrated in FIG. 6.

As illustrated in FIGS. 1 and 7, an outer reinforcement section 38 bulging toward the vehicle-width directional outward side is provided in the outer panel 17 at a position rearward of the bending facilitating section 36. The outer reinforcement section 38 is provided correspondingly to the setup region of the depressed section 23 formed in the inner panel 18, to extend over a range from a front region of the outer panel 17 at a position just rearward of the front bending facilitating section 36, to a rear region of the outer panel 17 at a position rearward of the rear bending facilitating section 34, in the front-rear direction. As illustrated in FIG. 4, the outer reinforcement section 38 is provided at a height position overlapping the welded point x where the wall surface portion corresponding to the depressed section 23 (lower region of the lateral wall surface portion 22 of the inner panel 18) and the reinforcing member 25 are spot-welded together, in side view.

The other, non-illustrated, front side frame 2 located on a side (in this embodiment, right side of the vehicle) where the engine 5 is installed is configured in the same manner as that in the front side frame 2 on the side of the transaxle assembly 6, except that the depressed section 23 and the reinforcing member 25 are not provided therein.

In the above configuration, as illustrated in FIG. 6, when a large collision load is input into the bumper beam 1 during a vehicle frontal collision, the collision load is input into the crush can 3 provided at the front end of each of the front side frames 2. The rigidity of the crush can 3 is set to be less than that of the front side frame 2, for example, by forming the crush can 3 using a steel plate having a plate thickness less than that of the front side frame 2, so that the crush can 3 is compressively deformed in an accordion-folded manner according to the collision load, and the collision load is absorbed by the deformation of the crush can 3.

The crush can 3 is formed in an approximately cross shape having the protruding portions 12 to 15 protruding in the up-down direction and the right-left direction, in front view, so that a section modulus of the crush can 3 in the up-down direction and the right-left direction is set to a large value. In the event of a frontal offset collision where an obstacle collides against one corner of a front end of a vehicle body, a collision load is input concentratedly into one of the crush cans 3 disposed on the right and left sided of the vehicle body, as indicated by the arrowed line A in FIG. 1. Even in this situation, it becomes possible to allow the one crush can 3 to be compressively deformed in an accordion-folded manner while preventing the one crush can 3 from being bendingly deformed, thereby effectively absorbing the collision load.

Further, the central axis P1 of the front region of the front side frame 2 is disposed to be offset toward the vehicle-width directional outward side with respect to the central axis P2 of the rear region of the front side frame 2, and the bending facilitating sections 34, 36 are provided at two points in the front-rear direction, so that, during an action of a large collision load which cannot be absorbed only by deformation of the crush cans 3, the side frame 2 will be bendingly deformed on the basis of the bending facilitating sections 34, 36.

In this situation, the reinforcement sections 24, 37 are formed in the front region of the front side frame 2, so that, during input of the above large collision load, the rear region of the front side frame 2 is deformed in such a manner as to be bent toward the vehicle-width directional outward side, on the basis of the front bending facilitating section 36 formed in the outer panel 17, as illustrated in FIG. 6, while preventing the front region of the front side frame 2 from being largely bent. In response to this, the front-rear directional intermediate region of the front side frame 2 is deformed in such a manner as to be bent toward the vehicle-width directional outward side about the rear bending facilitating section 34 formed in the inner panel 18 of the front side frame 2, whereby collision energy is absorbed while avoiding interference with the power train 7.

As above, in the above embodiment, a front side frame 2 has a depressed section 23 formed in a lower region of a vehicle-width directional inner wall surface portion (inner panel 18) thereof in such a manner as to be depressed toward a vehicle-width directional outward side so as to avoid interference with a powertrain 7, wherein the front side frame 2 is internally provided with a reinforcing member 25 extending over a front-rear directional dimension of the depressed section 23, and wherein an upper portion (upper plate 27) of the reinforcing member 25 is joined to at least one of a vehicle-width directional intermediate region of an upper wall portion 26 of the front side frame 2 and an area of the upper wall portion 26 located outward side of the intermediate region, and a lateral portion (lateral plate 28) of the reinforcing member 25 is joined to a wall surface portion corresponding to the depressed section 23, so that there is an advantage of being able to effectively absorb a vehicle collision load, while sufficiently ensuring an installation space for the powertrain 7 in a front of a vehicle.

More specifically, in the above embodiment, in a front body structure for a so-called hybrid vehicle in which a transverse-mounted engine 5 and a transaxle assembly 6 are provided side-by-side in a vehicle width direction in a front of a vehicle body, a depressed section 23 depressed toward a vehicle-width directional outward side is formed in a lower region of a vehicle-width directional inner wall surface portion of a front side frame 2 located on a side where the transaxle assembly 6 is installed, to avoid interference between the transaxle assembly 6 and the front side frame 2, so that it becomes possible to avoid interference between the front side frame 2 and the trans axle assembly 6 without taking measures, such as an increase in installation height of the front side frame 2 or an increase in installation width of the front side frame 2.

Thus, there is an advantage of being able to, even in a hybrid vehicle having difficulty in avoiding an increase in size of a powertrain 7 due to a presence of the above trans axle assembly 6 as compared to a commonly-used engine-driven vehicle using only a gasoline or diesel engine as a driving source, or an electric vehicle using only a electric motor as a driving source, adequately install the front side frame 2 and the powertrain 7 in a compact manner, without causing a problem, such as an excessively increase in installation height of the front side frame 2, or an increased in size of a front of a vehicle body.

Further, as illustrated in FIG. 4, the upper portion of the reinforcing member 25 provided inside the front side frame 2 to extend over the depressed section 23 in the front-rear direction is joined to at least one of the vehicle-width directional intermediate region of the upper wall portion 26 of the front side frame 2 and the area of the upper wall portion 26 located outward side of the intermediate region, and the lateral portion of the reinforcing member 25 is joined to the wall surface portion of the depressed section 23, so that it becomes possible to transmit a collision load input into the lower region of the front side frame 2 formed with the depressed section 23 during a vehicle frontal collision, to the upper wall portion 26 of the front side frame 2 via the reinforcing member 25, thereby bearing the collision load in a dispersed manner.

Thus, even in a situation where the depressed section 23 is formed in the lower region of the vehicle-width directional inner wall surface portion of the front side frame 2 to avoid interference with the transaxle assembly 6, and a collision load acts concentratedly on the setup region of the depressed section 23 formed to have a smaller width dimension than an upper region of the front side frame 2, it becomes possible to effectively suppress a situation where the front side frame 2 is largely bendingly deformed according to the collision load, and prevent the occurrence of a situation where an effect of absorbing the collision load is spoiled due to interference of the front side frame 2 with the powertrain 7.

In the above embodiment, the cross-sectionally closed front side frame 2 extending in the front-rear direction of the vehicle is formed by joining an outer panel 17 making up a vehicle-width directional outer wall surface portion of the front side frame 2, and a cross-sectionally angular C-shaped inner panel 18 disposed inward side of the outer panel 17, at respective upper and lower edge regions thereof, wherein the depressed section 23 is formed in the inner panel 18 of the front side frame 2, and the upper portion (upper plate 27) and the lateral portion (lateral plate 28) of the reinforcing member 25 are joined to the inner panel 18, so that there is an advantage of readily produce the front side frame 2 by preliminarily spot-welding the reinforcing member 25 to the inner panel 18, and then spot-welding the resulting sub-assembly and the outer panel 17 together.

For example, it is conceivable that three panel members consisting of the outer panel 17, the inner panel 18 and the reinforcing member 25 are superimposed on each other, and, in this state, they are joined together by spot-welding. In this case, however, it is necessary to perform a complicated operation of accurately positioning and joining the three panel members and, in this state, spot-welding them all together. On the other hand, in the above embodiment, the front side frame 2 can be produced readily and adequately by preliminarily spot-welding the reinforcing member 25 and the inner panel 18 together in an accurately positioned state, and then spot-welding the resulting sub-assembly and the outer panel 17 together in an accurately positioned state.

In the above embodiment, a front region of the depressed section 23 formed in the front side frame 2 has an upper edge 23*a* extending from an area above an up-down directional center of the front side frame 2, to a front side of the vehicle, while curving obliquely frontwardly and downwardly, and the reinforcing member 25 is joined to the wall surface portion of the depressed section 23 at an up-down directional approximately central position of the front side frame 2. In this case, there is an advantage of being able to effectively transmit a collision load input from the front end of the front side frame 2 into the setup region of the depressed section 23 during a vehicle frontal collision, to the upper wall portion 26 of the front side frame 2 via the reinforcing member 25, thereby stably bearing the collision load.

In the above embodiment, the front side frame 2 has a front-rear directionally extending reinforcement section 24 provided in the vehicle-width directional inner wall surface portion thereof at a position overlapping the depressed section 23 in front view and frontward of the depressed section 23, wherein an front end of the reinforcing member 25 is joined to the vehicle-width directional inner wall surface portion of the front side frame 2 at a height position equal to that of the reinforcement section 24, so that it becomes possible to bear a collision load transmitted from the reinforcement section 24 of the front side frame 2 to the setup region of the depressed section 23 during a frontal offset collision where an obstacle collides against one corner of a front end of a vehicle body, while transmitting the collision load, for example, to the upper wall portion 26 of the front side frame 2, via the reinforcing member 25. Thus, there is an advantage of being able to effectively prevent the occurrence of abnormal deformation in the depressed section 23 of the front side frame 2 due to a phenomenon that the collision load acts concentratedly on the depressed section 23, and prevent the occurrence of a situation, for example, where an effect of absorbing the collision load is spoiled due to interference of the front side frame 2 with the powertrain 7.

In the above embodiment, a crush can 3 formed in an approximately cross-like shape in front view is provided at a front end of the front side frame 2, wherein a protruding portion 14 of the crush can 3 on a vehicle-width directional inward side is disposed to overlap the reinforcement section 24 of the front side frame 2 in front view, so that, even in a situation where a collision load is input concentratedly into one of the crush cans 3 disposed, respectively, on right and left sides of the vehicle body as indicated by the arrowed line A in FIG. 1 during a frontal offset collision where an obstacle collides against one corner of the front end of the vehicle body, it becomes possible to compressively deform the crush can 3 in an accordion-folded manner while preventing the crush can 3 from being bendingly deformed, thereby effectively absorbing the collision load.

Then, the collision load input from the protruding portion 14 of the crush can 3 into the reinforcement section 24 of the front side frame 2 and transmitted from the reinforcement section 24 to the setup region of the depressed section 23 can be born while being transmitted to the upper wall portion 26 of the front side frame 2 via the reinforcing member 25. Thus, there is an advantage of being able to prevent a situation where the collision load acts concentratedly on the depressed section 23 provided in the vehicle-width directional inner wall surface portion of the front side frame 2, thereby effectively preventing the occurrence of a situation where the front side frame 2 is largely deformed in the setup region of the depressed section 23.

In the above embodiment, the reinforcing member 25 is formed with a bulging section 30 bulging toward a vehicle-width directional inward side in front view and extending in the front-rear direction of the vehicle, so that it becomes possible to increase a ridge line of the reinforcing member 25 to effectively increase a section modulus in front view, thereby sufficiently ensuring rigidity of the reinforcing member 25 in the front-rear direction. Thus, the reinforcing member 25 provided inside the front side frame 2 makes it possible to efficiently reinforce the front side frame 2, and further effectively prevent the occurrence of the situation where the front side frame 2 is largely deformed in the setup region of the depressed section 23.

In the above embodiment, as illustrated in FIG. 5, a mounting member 33 is provided on an upper region of the front side frame 2 to mount thereto a vehicle component, and installed to couple upper and lower sides of the bulging section 25 of the reinforcing member 25, so that the mounting member 33 can be utilized as a reinforcing member for the bulging section 30. Thus, there is an advantage of being able to sufficiently enhance the rigidity of the reinforcing member 25 with a simple configuration, thereby effectively reinforcing the front side frame 2 by the reinforcing member 25, and effectively preventing deformation of the front side frame 2 in the setup region of the depressed section 23.

In the above embodiment, two bending facilitating sections 34, 36 are provided in an area located frontward of and an area located rearward of the depressed section 23 of the front side frame 2, to facilitate bending of the front side frame 2 according to a frontal collision load, so that there is an advantage of being able to allow the front side frame 2 to be deformed on front and rear sides of the depressed section 23 according to an input of a collision load during a vehicle front collision, just as desired, thereby preventing the occurrence of a situation, for example, where an effect of absorbing the collision load is spoiled due to interference of the front side frame 2 with the powertrain 7.

In the above embodiment, an outer reinforcement section 38 is provided in the outer panel 17 making up a vehicle-width directional outer wall surface portion of the front side frame 2 to extend in the front-rear direction at a position overlapping the depressed section 23 in side view, wherein the outer reinforcement section 38 is provided to extend to a position rearward of the bending facilitating section 34 located rearward of the depressed section 23, so that it becomes possible to validly avoid instability in a deformation mode of the front side frame 2 during a vehicle frontal collision, while reinforcing the setup region of the depressed section 23 by the outer reinforcement section 38.

That is, when the outer reinforcement section 38 is provided in the outer panel 17, bending rigidity in the setup region of the depressed section 23 is enhanced, whereas stress concentration is more likely to occur at an end of outer reinforcement section 38, and thereby the deformation mode of the front side frame 2 is likely to become unstable because the end serves as a center of deformation. On the other hand, when the outer reinforcement section 38 extends to a position rearward of the bending facilitating section 34 located rearward of the depressed section 23, the front side frame 2 is deformed about the bending facilitating section 34 located frontward of a rear end of the outer reinforcement section 38, so that it becomes possible to avoid a situation where the rear end of the outer reinforcement section 38 serves as a center of deformation, thereby inducing deformation of the front side frame 2 just as desired.

In the above embodiment, a position of a front end of the outer reinforcement section 38 is set to a vicinity of the bending facilitating section 36 provided in a front region of the outer panel 17. This provides a large difference in rigidity between front and rear sides of the bending facilitating section 36, so that deformation is more likely to occur about the bending facilitating section 36, thereby more reliably achieving the deformation mode of the front side frame 2 during a vehicle frontal collision, just as desired.

Figure 8:
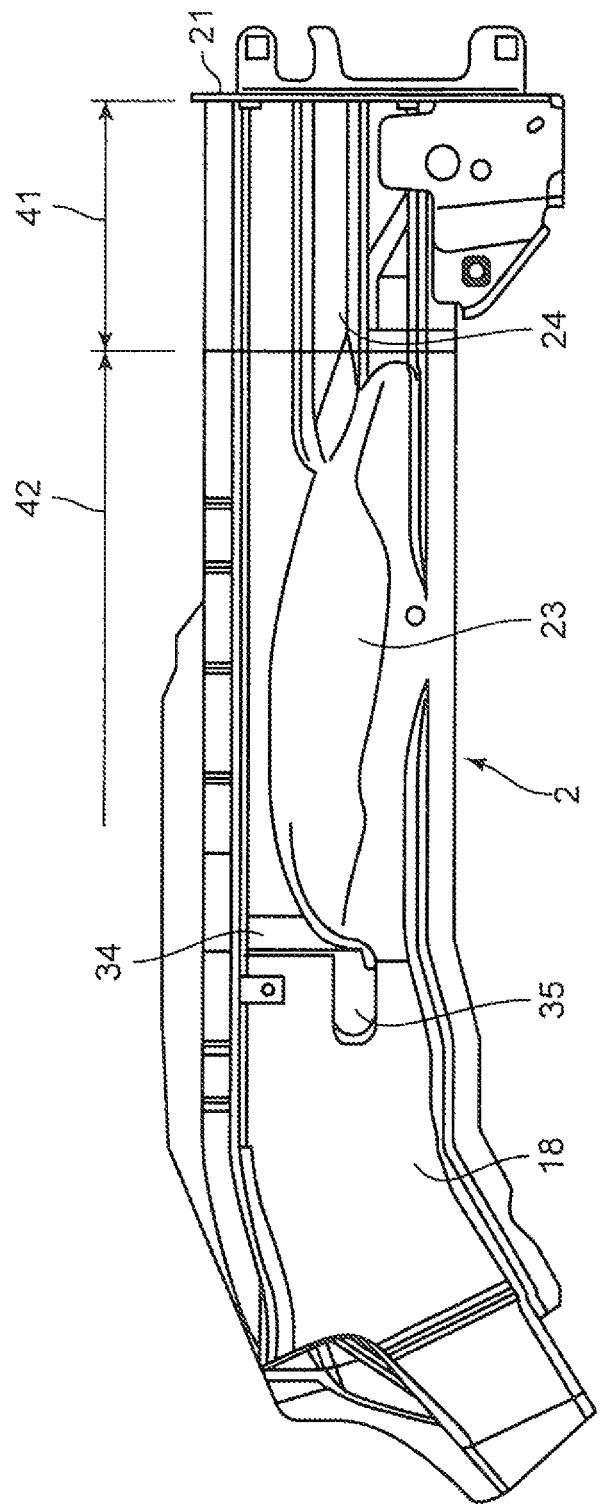
FIG. 8 is a side view illustrating another embodiment of the vehicle front body structure according to the present invention.

The vehicle-width directional inner wall surface portion of the front side frame 2 composed of the inner panel 18 may be formed using the same material over its vehicle-widthwise directional overall length. Alternatively, as illustrated in FIG. 8, a front zone 41 located frontward of the depressed section 23 of the front side frame 2, and a rear zone 42 located rearward of the front zone 41 may be formed using different materials, respectively, to form the front zone 41 located frontward of the depressed section 23 as a low rigidity section configured to be low in rigidity against a front-rear directional load in, as compared to the rear zone 42.

For example, it is conceivable that the rigidity of the front zone 41 in the front-rear direction is set to be less than that of the rear zone 42, for example, by forming the front zone 41 located frontward of the depressed section 23, using a material having a strength less than that of the rear zone 42, or setting a thickness of a material for the front zone 41 to a value less than that of the rear zone 42. In this case, there is an advantage of being able to allow the front zone 41 located frontward of the depressed section 23 to be positively deformed according to a collision load input into the front side frame 2 during a vehicle frontal collision, thereby effectively absorbing the collision load, and more effectively suppressing deformation of the front side frame 2 in the setup region of the depressed section 23.

Although the above embodiment has been described based on an example where the outer panel 17, the inner panel 18 and the reinforcing member 25 constituting the front side frame 2 are joined together by spot welding, it is to be understood that the joining method is not limited to spot welding, but any well-known joining method, such as arc welding, welding based on high-energy beam irradiation using laser, plasma or the like, or friction stir welding, may be appropriately used.

Further, in the above embodiment, the outer reinforcement section 38 is formed by causing a part of the outer panel 17 to bulge toward the vehicle-width directional outward side. Alternatively, the outer reinforcement section may be formed by depressing a part of the outer panel 17 toward the vehicle-width directional inward side. Alternatively, a rib, as the outer reinforcement section, may be joined to the outer panel to extend in the front-rear direction.

Lastly, distinctive features disclosed in the above embodiment and functions and advantages based on the features will be outlined below.

A technique disclosed in the above embodiment relates to a vehicle front body structure comprising a cross-sectionally closed front side frame (2) installed to extend in a front-rear direction of a vehicle. The front side frame (2) has a depressed section (23) formed in a lower region of a vehicle-width directional inner wall surface portion thereof in such a manner as to be depressed toward a vehicle-width directional outward side so as to avoid interference with a powertrain (7). The front side frame (2) is internally provided with a reinforcing member (25) extending over a front-rear directional dimension of the depressed section (23). An upper portion of the reinforcing member (25) is joined to at least one of a vehicle-width directional intermediate region of an upper wall portion (26) of the front side frame (2) and an area of the upper wall portion (26) located outward side of the intermediate region, and a lateral portion of the reinforcing member (25) is joined to a wall surface portion corresponding to the depressed section (23).

According to this feature, the depressed section depressed toward the vehicle-width directional outward side is formed in the lower region of the vehicle-width directional inner wall surface portion of the front side frame, to avoid interference with the powertrain, so that it becomes possible to avoid interference between the front side frame and the powertrain without taking measures, such as an increase in installation height of the front side frame or an increase in installation width of the front side frame. Therefore, for example, even in a hybrid vehicle having a large volume of power train, it becomes possible to adequately install the front side frame and the powertrain in a compact manner, without causing a problem, such as an excessively increase in installation height of the front side frame, or an increased in size of a front of a vehicle body. Further, the upper portion of the reinforcing member provided inside the front side frame to extend over a setup length of the depressed section in the front-rear direction is joined to at least one of the vehicle-width directional intermediate region of the upper wall portion of the front side frame and the area of the upper wall portion located outward side of the intermediate region, and the lateral portion of the reinforcing member is joined to the wall surface portion of the depressed section, so that it becomes possible to transmit a collision load input into the lower region of the front side frame formed with the depressed section during a vehicle frontal collision, to the upper wall portion of the front side frame via the reinforcing member, thereby bearing the collision load in a dispersed manner. This provides an advantage of being able to effectively suppress a situation where the front side frame is largely bendingly deformed according to the collision load, thereby preventing the occurrence of a situation where an effect of absorbing the collision load is spoiled due to interference of the front side frame with the powertrain.

Preferably, in the above front body structure, the front side frame (2) has an outer panel (17) making up a vehicle-width directional outer wall surface portion thereof, and a cross-sectionally angular C-shaped inner panel (18) disposed inward side of the outer panel (17), the outer panel (17) and the inner panel (18) being joined to each other at respective upper and lower edge regions thereof, wherein the depressed section (23) is formed in the inner panel (18) of the front side frame (2), and the upper portion and the lateral portion of the reinforcing member (25) are joined to the inner panel (18).

According to this feature, there is an advantage of readily produce the front side frame by preliminarily joining the reinforcing member to the inner panel by means of spot-welding or any other suitable joining method, and then joining the resulting sub-assembly and the outer panel together by means of spot-welding or any other suitable joining method.

Preferably, in the front body structure, a front region of the depressed section (23) formed in the front side frame (2) has an upper edge (23a) extending from an area above an up-down directional center of the front side frame (2), to a front side of the vehicle, while curving obliquely frontwardly and downwardly, and the reinforcing member (25) is joined to the wall surface portion of the depressed section (23) at an up-down directional approximately central position of the front side frame (2).

According to this feature, there is an advantage of being able to effectively transmit a collision load input from the front end of the front side frame into the setup region of the depressed section during a vehicle frontal collision, to the upper wall portion of the front side frame via the reinforcing member, thereby stably bearing the collision load.

Preferably, in the above front body structure, the front side frame (2) has a front-rear directionally extending reinforcement section (24) provided in the vehicle-width directional inner wall surface portion thereof at a position overlapping the depressed section (23) in front view and frontward of the depressed section (23), wherein an front end of the reinforcing member (25) is joined to the vehicle-width directional inner wall surface portion of the front side frame (2) at a height position equal to that of the reinforcement section (24).

According to this feature, it becomes possible to bear a collision load transmitted from the reinforcement section to the setup region of the depressed section during a frontal offset collision where an obstacle collides against one corner of a front end of a vehicle body, while transmitting the collision load to the upper wall portion of the front side frame via the reinforcing member. Thus, there is an advantage of being able to effectively prevent the occurrence of abnormal deformation in the depressed section of the front side frame due to a phenomenon that the collision load acts concentratedly on the depressed section, and prevent the occurrence of a situation, for example, where an effect of absorbing the collision load is spoiled due to interference of the front side frame with the powertrain.

Preferably, in the above front body structure, the reinforcing member (25) has a bulging section (30) bulging toward a vehicle-width directional inward side in front view and extending in the front-rear direction of the vehicle.

As above, the reinforcing member is formed with the bulging section in this manner. Thus, it becomes possible to increase a ridge line of the reinforcing member to effectively increase a section modulus in front view, thereby sufficiently ensuring rigidity of the reinforcing member in the front-rear direction. In addition, the reinforcing member formed with the bulging section is provided inside the front side frame. Thus, it becomes possible to efficiently reinforce the front side frame, and further effectively prevent the occurrence of the situation where the front side frame is largely deformed in the setup region of the depressed section.

Preferably, the above front body structure comprises a mounting member (33) provided on an upper region of the front side frame (2) to mount thereto a vehicle component, and installed to couple upper and lower sides of the bulging section (30) of the reinforcing member (25).

According to this feature, the mounting member for mounting thereto a vehicle component can be utilized as a reinforcing member for the bulging section, so that there is an advantage of being able to sufficiently enhance the rigidity of the reinforcing member with a simple configuration, thereby effectively reinforcing the front side frame by the reinforcing member, and effectively preventing deformation of the front side frame in the setup region of the depressed section.

Preferably, in the above front body structure, the front side frame (2) has a bending facilitating section (34 or 36) provided in at least one of an area located frontward of the depressed section (23), and an area located rearward of the depressed section (23), to facilitate bending of the front side frame (2) according to a frontal collision load.

More preferably, in this case, the bending facilitating section (34, 36) is provided in both of the area located frontward of the depressed section (23), and the area located rearward of the depressed section (23).

According to these features, it becomes possible to allow the front side frame to be deformed on front and rear sides of the depressed section according to an input of a collision load during a vehicle front collision, just as desired, thereby effectively preventing the occurrence of a situation, for example, where an effect of absorbing the collision load is spoiled due to interference of the front side frame with the powertrain.

Preferably, in the above front body structure, the front side frame (2) has a low rigidity section formed in a front zone (41) located frontward of the depressed section (23) and configured to be low in rigidity against a front-rear directional load, as compared to a rear zone (42) located rearward of the front zone (41).

According to this feature, there is an advantage of being able to allow the front zone located frontward of the depressed section to be positively deformed according to a collision load input into the front side frame during a vehicle frontal collision, thereby effectively absorbing the collision load, and more effectively suppressing deformation of the front side frame in the setup region of the depressed section.

Preferably, the above front body structure comprises a crush can (3) formed in an approximately cross-like shape in front view and provided at a front end of the front side frame (2), wherein a protruding portion (14) of the crush can (3) on a vehicle-width directional inward side is disposed to overlap the reinforcement section (24) of the front side frame (2) in front view.

According to this feature, even in a situation where a collision load is input concentratedly into one of the crush cans disposed, respectively, on right and left sides of the vehicle body during a frontal offset collision where an obstacle collides against one corner of the front end of the vehicle body, it becomes possible to compressively deform the crash can in an accordion-folded manner while preventing the crush can from being bendingly deformed, thereby effectively absorbing the collision load. Then, the collision load input from the protruding portion of the crush can into the reinforcement section of the front side frame and transmitted from the reinforcement section to the setup region of the depressed section can be born while being transmitted to the upper wall portion of the front side frame via the reinforcing member, so that there is an advantage of being able to prevent a situation where the collision load acts concentratedly on the depressed section provided in the vehicle-width directional inner wall surface portion of the front side frame, thereby effectively preventing the occurrence of a situation where the front side frame is largely deformed in the setup region of the depressed section.

Preferably, in the above front body structure, the front side frame (2) has an outer reinforcement section (38) provided in a vehicle-width directional outer wall surface portion thereof to extend in the front-rear direction at a position overlapping the depressed section (23) in side view.

According to this feature, the setup region of the depressed section in the front side frame can be reinforced by the outer reinforcement section (38).

Preferably, in the above front body structure, the front side frame (2) has a bending facilitating section (34) provided in the vehicle-width directional inner wall surface portion thereof at a position located rearward of the depressed section (23), to facilitate bending of the front side frame (2) according to a frontal collision load, wherein the outer reinforcement section (38) is provided to extend to a position rearward of the bending facilitating section (34) located rearward of the depressed section (23).

Stress concentration is more likely to occur at a rear end of the outer reinforcement section due to a difference in rigidity, and thereby there is concern that the front side frame is deformed about the rear end of the outer reinforcement section. On the other hand, when the outer reinforcement section extends to a position rearward of the bending facilitating section located rearward of the depressed section in the above manner, the front side frame is deformed about the bending facilitating section located frontward of the rear end of the bending facilitating section, so that it becomes possible to avoid a situation where the rear end of the outer reinforcement section serves as a center of deformation, thereby inducing deformation of the front side frame, just as desired.

What is claimed is:

1. A vehicle front body structure comprising a cross-sectionally closed front side frame installed to extend in a front-rear direction of a vehicle, wherein:

the front side frame has an outer panel making up a vehicle-width directional outer wall surface portion thereof, and a cross-sectionally angular C-shaped inner panel disposed inward side of the outer panel, the outer panel and the inner panel being joined to each other at respective upper and lower edge regions thereof, the inner panel having a depressed section formed in a lower region of a lateral wall surface portion thereof in such a manner as to be depressed toward a vehicle-width directional outward side so as to avoid interference with a powertrain, the front side frame being internally provided with a reinforcing member extending over a front-rear directional dimension of the depressed section;

the reinforcing member has an upper plate joined to at least one of a vehicle-width directional intermediate region of an upper wall portion of the inner panel and an area of the upper wall portion located outward side of the intermediate region, and a lateral plate extending downwardly from a vehicle-width directional inner end of the upper plate and joined to a wall surface portion corresponding to the depressed section of the inner panel;

a front region of the depressed section has an upper edge extending from an area above an up-down directional center of the front side frame, to a front side of the vehicle, while curving obliquely frontwardly and downwardly;

the lateral plate of the reinforcing member is joined to the wall surface portion of the depressed section at an up-down directional approximately central position of the front side frame;

the inner panel has a front-rear directionally extending reinforcement section provided in the lateral wall surface portion thereof on a frontward side with respect to the depressed section, the reinforcement section being set at a position which overlaps the depressed section in front view and becomes equal to a height position of a joined area between the reinforcing member and the wall surface portion of the depressed section; and the reinforcing member has a bulging section formed in an upper region of the lateral plate thereof located above the joined area between the reinforcing member and the wall surface portion of the depressed section, to bulge toward a vehicle-width directional inward side in front view and extending in the front-rear direction of the vehicle.

2. The vehicle front body structure as defined in claim 1, further comprising a mounting member provided on the upper wall portion of the inner panel of the front side frame to mount thereto a vehicle component, and installed to couple upper and lower sides of the bulging section of the reinforcing member.

3. The vehicle front body structure as defined in claim 1, further comprising bending facilitating sections provided in both of an area located frontward of the depressed section and an area located rearward of the depressed section, to facilitate bending of the front side frame according to a frontal collision load.

4. The vehicle front body structure as defined in claim 1, further comprising a crush can formed in an approximately cross-like shape in front view and provided at a front end of the front side frame, wherein a protruding portion of the crush can on a vehicle-width directional inward side is disposed to overlap the reinforcement section of the front side frame in front view.

5. The vehicle front body structure as defined in claim 1, wherein the front side frame has an outer reinforcement section provided in the outer panel to extend in the front-rear direction, the outer reinforcement section being set at a position which overlaps the depressed section in side view and becomes equal to a height position of a joined area between the reinforcing member and the wall surface portion of the depressed section.

* * * * *